A. GUÉRINEAU.
GAGE FOR WATCH GLASSES AND GROOVES AND FILLETS.
APPLICATION FILED OCT. 7, 1908.
920,051.
Patented Apr. 27, 1909.
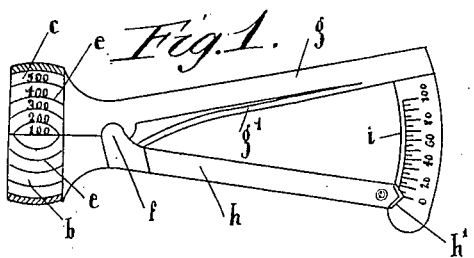
Fig. 1.
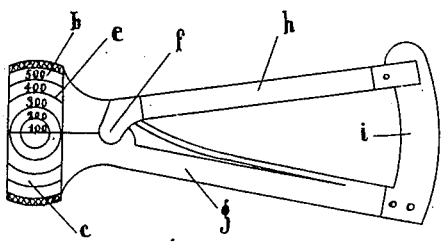
Fig. 2.
Fig. 3
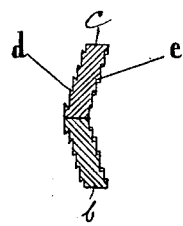
Witnesses
Joseph Debordes
Henri Boettcher
Inventor
Antonin Guérineau

UNITED STATES PATENT OFFICE.

ANTONIN GUÉRINEAU, OF SECONDIGNY, FRANCE.

GAGE FOR WATCH-GLASSES AND GROOVES AND FILLETS.

No. 920,051.  Specification of Letters Patent.  Patented April 27, 1909.

Application filed October 7, 1908. Serial No. 456,671.

*To all whom it may concern:*

Be it known that I, ANTONIN GUÉRINEAU, a citizen of the French Republic, residing at Secondigny, France, have invented new and useful Improvements in Gages for Watch-Glasses and Grooves and Fillets, of which the following is a specification.

The present invention relates to a gage for measuring watch-glasses and the grooves and fillets so that the number of the glass can be immediately found by measuring the groove.

The instrument, which forms the object of this invention, saves much time which at present is lost by trying the watch-glasses and prevents the breaking off of the edge of the glasses.

In the annexed drawings the gage is shown by way of example.

Figure 1 is a side view of the gage seen from the side which presents the grooves for measuring the glasses. Fig. 2 shows the other side of the gage. Fig. 3 is a longitudinal section through the head part of the instrument.

The gage $a$ which has the form of tongs, comprises two jaws $b$ and $c$ which are made of superposed steel plates fixed by means of rivets or cast in one piece. The jaws have projections $d$ and cavities $e$ which can be produced by engraving. The projections $d$ are arc shaped and form steps; they are beveled so as to well penetrate into the grooves. The jaws $b$ and $c$ are connected by means of an axle $f$ serving as pivot, each jaw having an arm $g$ and $h$ respectively. The arm $g$ carries a scale $i$ the graduations of which correspond to 1/10 of a millimeter, the other arm $h$ terminates in an indicator $h^1$. The arm $g$ has a spring $g^1$ which serves for maintaining the tongs closed.

To find out the proper number of a watch-glass for a watch, the projections $d$ of the gage are inserted into the groove of the watch until the proper size of the groove has been ascertained. The number of the glass is indicated on the jaw and the fractions are indicated on the scale. In inserting the proper watch-glass into the corresponding cavity of the gage one can find out at once whether the glass is of the proper size or not. The numbers on the jaws (Figs. 1 and 2) are 1/10 of a millimeter and the indications upon the scale represent the fractions between the indications marked upon the jaws.

I claim:—

A gage for watch-glasses and the groove of a case center of a watch consisting of tongs comprising two pivoted arms formed at one end with jaws having arc shaped projections on one side and arc shaped hollows on the other side, the projections serving for measuring the grooves and the hollows for measuring the watch-glass, a scale at the other end of one arm and an indicator at the corresponding end of the other arm moving over said scale, substantially as described and for the purpose set forth.

ANTONIN GUÉRINEAU.

Witnesses:
 JOSEPH DEBORDES,
 HENRI BOETTCHER.